(No Model.)

T. M. McKEE.
DISH CLEANER.

No. 580,797. Patented Apr. 13, 1897.

WITNESSES
L. L. Johnson
M. C. Proctor

INVENTOR
Thos. M. McKee
BY Thurman & Silvius
ATTORNEYS

UNITED STATES PATENT OFFICE.

THOMAS M. McKEE, OF INDIANAPOLIS, INDIANA.

DISH-CLEANER.

SPECIFICATION forming part of Letters Patent No. 580,797, dated April 13, 1897.

Application filed August 3, 1896. Serial No. 601,448. (No model.)

*To all whom it may concern:*

Be it known that I, THOMAS M. MCKEE, a citizen of the United States, residing at Indianapolis, in the county of Marion and State of Indiana, have invented certain new and useful Improvements in a Combined Dish-Washer and Fruit-Cooker; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to a portable apparatus for household use; and it consists of a combination and peculiar arrangement of elements whereby I provide a vessel which is adapted both for washing dishes and for cooking fruit in the original cans or otherwise, if desired, as will be more fully described hereinafter.

The object of my invention is to provide an apparatus or utensil in which the operation of washing or cleansing dishes is facilitated by forcing air into the water and rendered less disagreeable to the housekeeper, which may be easily operated and obviate the danger of damage or breaking dishes.

A further object is to render such an apparatus useful for other purposes, such as cooking fruit, &c., without requiring an additional expenditure for other utensils. These objects are fully attained in my invention, which may be cheaply constructed, is of few parts, and is durable and economical in use.

Figure 1:
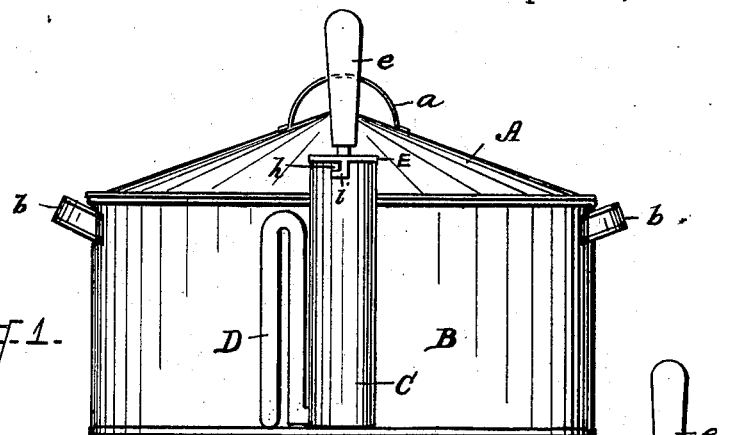
Figure 2:
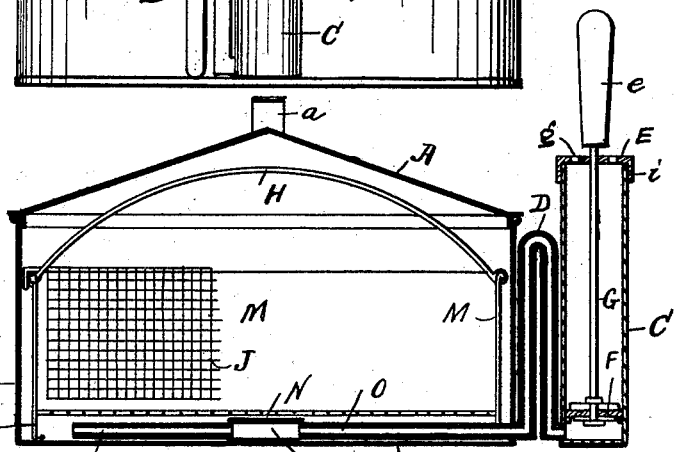
Figures 3, 4:
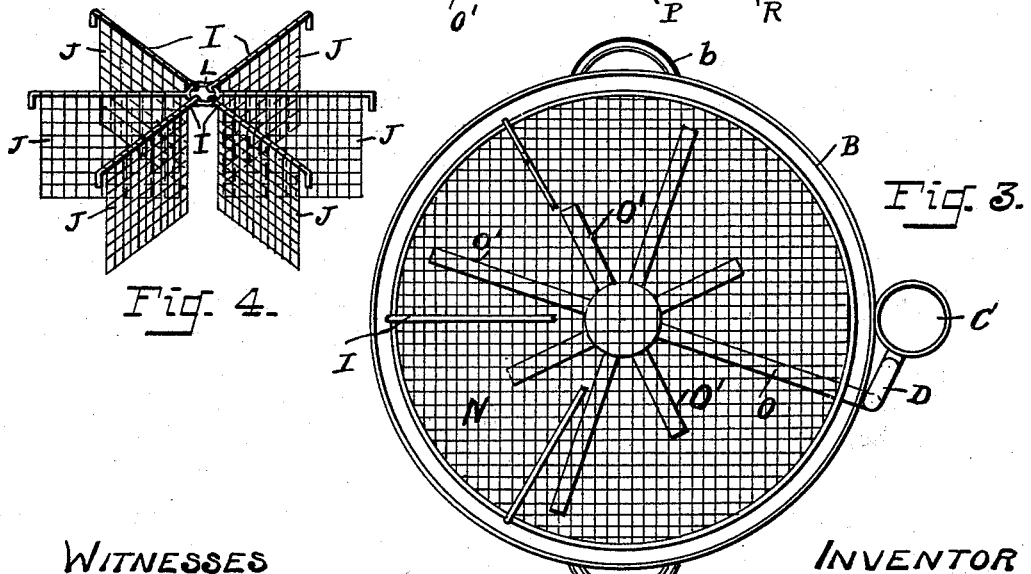

Referring to the drawings, Figure 1 represents an elevation of my device; Fig. 2, a central vertical sectional view; Fig. 3, a plan view in which the cover is removed; and Fig. 4 is a perspective view of removable screen partitions.

In the drawings, B designates the vessel; A, the cover therefor; C, the air-pump for agitating the water to be used within the vessel; O, air-conduit, and O' air-distributing pipes; M, a basket having a screen bottom N, and J removable screen partitions.

In constructing my apparatus I make the vessel B of any suitable metal, such as tin or galvanized-iron, having a bottom R. The sides are provided with handles $b$. The cover A is preferably cone-shaped and is provided with a lifting-handle $a$. I provide a pump C, composed of a cylindrical tube inclosed at its lower end, which has working in the interior a piston F, connected by a rod G to a handle $e$. The rod G is guided centrally at its upper end by means of a cap E, having perforations $g$, which is attachable to the upper end of the pump-body and secured by means of hooks $i$, engaging with any suitable dowel or projections at $h$. At the bottom of the pump-body a conducting-pipe D is attached, communicating with the interior between the inclosed end and the piston. From the point of connection the pipe is elevated to a point near the upper part of the vessel B, where it bends and returns to the lower part of the vessel, where it enters the same, forming a tight joint between its exterior and the side of the vessel. This pipe follows the bottom of the vessel as the conducting-pipe (designated as O) to the center reservoir P, to which is connected radiating distributing-pipes O', of different lengths, having their outer ends open, from which the air forced by the pump is expelled to agitate the water in the vessel. A basket M is formed, preferably of sheet metal, although wire screen or perforated metal may be used, in which is a screen bottom N, having supporting-legs $m$, which rest upon the bottom of the vessel. A suitable bail H is attached for lifting the basket and contents. The screen partitions J are made preferably of wire-netting in the form of wings radiating from the center and are attached at the top to supporting-rods I, which are linked at their inner ends to a ring L, so that the spaces between any two wings may be increased or decreased, as desired, and permitting the wings to be folded together, so as to lie flat when not in use. These partitions may be inserted from the top into the basket and are supported by means of the rods I, having hooks at their outer ends upon the top edges of the basket.

When using the vessel for the purpose of washing dishes, the partitions are preferably removed, but may be used, if desired. The advantage of their use is more apparent when using the vessel for cooking fruits, &c., as they separate the various cans and prevent contact with each other, and also prevent the cans from capsizing should the force of the air and boiling water raise them from the bottom.

It is obvious that minor changes and modifications may be made in the details of construction without departing from the spirit of my invention, such as placing the pump within the vessel and other slight variations. In Fig. 2 the pump is shown as separated from the vessel simply to illustrate the circuit of the air-pipe, but it is preferably secured close to the sides of the vessel, as indicated in Fig. 3.

Having described my invention, what I claim, and desire to secure by Letters Patent, is—

1. A combined dish-washer and fruit-cooker, consisting of a vessel having a removable cover; an air-pump secured to said vessel and provided with a communicating air-pipe ramifying from the interior of said vessel near the bottom thereof by which air may be discharged into the interior of the vessel; a basket adapted to loosely fit into said vessel having a screen bottom and provided with a suitable bail; and a series of insertible and removable vertical screen partitions fitting into said basket, substantially as and for the purposes shown and described.

2. In an apparatus of the character described, the combination with a vessel adapted to contain water, of the pump C secured to said vessel, and having the communicating air-pipe D made in siphon form, said pipe terminating in distributing-pipes at the interior of said vessel near the bottom thereof; the basket situated within said vessel, and the vertical screen partitions insertible in said basket, substantially as shown and described.

In testimony whereof I affix my signature in presence of two witnesses.

THOMAS M. McKEE.

Witnesses:
  E. T. SILVIUS,
  JNO. S. THURMAN.